United States Patent [19]

Ebinuma et al.

[11] Patent Number: 4,934,153
[45] Date of Patent: Jun. 19, 1990

[54] METHOD FOR MANUFACTURING ICE CONTAINING CARBON DIOXIDE

[75] Inventors: Takao Ebinuma; Norihiko Koma; Yutaka Yamauti, all of Tokyo, Japan

[73] Assignee: NKK Corporation, Tokyo, Japan

[21] Appl. No.: 311,102

[22] Filed: Feb. 15, 1989

[30] Foreign Application Priority Data

Feb. 26, 1988 [JP] Japan .................. 63-45047

[51] Int. Cl.$^5$ .............................................. F75C 1/00
[52] U.S. Cl. ............................................. 62/66; 62/1
[58] Field of Search .................. 62/1, 66, 341; 100/211

[56] References Cited

U.S. PATENT DOCUMENTS

| | | | |
|---|---|---|---|
| 2,575,509 | 11/1951 | Bayston | 62/1 X |
| 3,269,157 | 8/1966 | Ashley | 100/211 X |
| 4,333,315 | 6/1982 | Zemelman et al. | 62/1 |
| 4,347,707 | 9/1982 | Zemelman et al. | 62/1 X |
| 4,398,394 | 8/1983 | Kleiner et al. | 62/1 |
| 4,753,082 | 6/1988 | Sudo et al. | 62/341 X |

FOREIGN PATENT DOCUMENTS 341740  1/1931  United Kingdom ................ 100/211

*Primary Examiner*—William E. Tapolcai
*Attorney, Agent, or Firm*—Frishauf, Holtz, Goodman & Woodward

[57] ABSTRACT

A method for manufacturing ice containing carbon dioxide comprises a process wherein ice grains or water as material used for ice containing carbon dioxide is charged into a pressure vessel, a process wherein the material is enveloped in an atmosphere of carbon dioxide and a process wherein a temperature and a pressure of the material is adjusted so that the temperature and the pressure can be values in the range enclosed with straight lines connecting the following points and A point in this order:

A: 0° C.: 2 kg/cm$^2$
B: 0° C.: 2 kg/cm$^2$
C: −7° C.: 1000 kg/cm$^2$
D: −21° C.: 1900 kg/cm$^2$
E: −50° C.: 440 kg/cm$^2$
F: −57° C.: 100 kg/cm$^2$
G: −57° C.: 2 kg/cm$^2$

Another method for manufacturing ice containing carbon dioxide comprises a process wherein a temperature and a pressure inside the pressure vessel are adjusted to the range and a process wherein carbonic acid water containing carbon dioxide is injeced in an antifreeze liquid.

19 Claims, 3 Drawing Sheets

METHOD FOR MANUFACTURING ICE CONTAINING CARBON DIOXIDE

BACKGROUND OF THE INVENTION

1. Field of the Invention

The present invention relates to a method for manufacturing ice containing carbon dioxide which is suitable for drinks.

2. Description of the Prior Art

Ice containing carbon dioxide as well as carbonic acid drinks much pleases its users with refreshment. However, since water has generally a feature of excluding impurities during its conversion to ice, being frozen, a high concentration of carbon dioxide as impurities in the ice is extremely hard to be included in the ice. Therefore, various technologies for manufacturing ice containing carbonic acid or carbon dioxide have been studied. In a Japanese Patent Application Laid Open No. 29961/81, for example, there is disclosed an apparatus for manufacturing ice containing carbonic acid or carbon dioxide which comprises a cylinder and means for discharging outwardly manufactured ice, means for supplying carbon dioxide, means for agitating contents and means for cooling said contents from the outside which are attached to said cylinder. In said apparatus, ice containing carbonic acid or carbon dioxide is manufactured by charging water and carbon dioxide gas into said cylinder and by cooling said water and carbon dioxide being, while agitating, to a temperature of from approximately $-10°$ to $-20°$ C.

There are, however, the following problems in said prior art.

(1) Transparent ice cannot be obtained since the ice becomes cloudy due to carbonic acid or carbon dioxide in the form of bubbles present in the ice.

(2) A high concentration of carbon dioxide cannot be included in ice.

(3) Most of carbon dioxide bubbles in ice gather on grain boundaries of ice crystals. In consequence, carbon dioxide goes easily out of the ice through the grain boundaries at of elevated temperature of the ice. Accordingly, it is impossible to keep stably the carbon dioxide in the ice for a long period of time.

Carbon dioxide molecules need to be present in crystal lattices so that a high concentration of the carbon dioxide can be contained in ice. In order that the carbon dioxide molecules can be present in crystal lattices, it is conceivable to substitute water molecules of ice for carbon dioxide molecules or to put the carbon dioxide molecules among the crystal lattices of ice. Even in use of such a way, a high concentration of the carbon dioxide cannot be included in ice.

SUMMARY OF THE INVENTION

It is an object of the present invention to provide a method for manufacturing ice which includes a high concentration of carbon dioxide stably for a long period of time and which is transparent and pleases its users with refreshment.

To accomplish said object, the present invention provides a method for manufacturing ice containing carbon dioxide which comprises a process, wherein ice grains or water as materials used for manufacturing ice containing carbon dioxide are charged into a pressure vessel; a process, wherein said materials are enveloped in an atmosphere of carbon dioxide gas; and a process, wherein a temperature of said materials and a pressure thereto are adjusted so that said temperature and said pressure can be in the range enclosed with straight lines connecting the following points and A point in this order in coordinates representing temperatures and pressures:

A: 0° C.: 2 kg/cm$^2$
B: 0° C.: 200 kg/cm$^2$
C: $-7°$ C.: 1000 kg/cm$^2$
D: $-21°$ C.: 1900 kg/cm$^2$
E: $-50°$ C.: 440 kg/cm$^2$
F: $-57°$ C.: 100 kg/cm$^2$
G: $-57°$ C.: 2 kg/cm$^2$

Further, the present invention provides a method for manufacturing ice containing carbon dioxide which comprises a process, wherein antifreeze liquid is charged into a pressure vessel; a process, wherein a temperature and a pressure inside pressure vessel are adjusted so that said temperature and said pressure can be in the range enclosed with lines connecting the following points and A point in coordinates representing temperatures and pressures:

A: 0° C.: 2 kg/cm$^2$
B: 0° C.: 200 kg/cm$^2$
C: $-7°$ C.: 1000 kg/cm$^2$
D: $-21°$ C.: 1900 kg/cm$^2$
E: $-50°$ C.: 440 kg/cm$^2$
F: $-57°$ C.: 100 kg/cm$^2$
G: $-57°$ C.: 2 kg/cm$^2$ and a process, wherein carbonic acid water containing a predetermined concentration of carbon dioxide gas is injected into the antifreeze liquid, a temperature and a pressure being kept at the level as mentioned above.

The above objects and other objects and advantages of the present invention will become apparent from the detailed description to follow, taken in connection with the appended drawings.

DESCRIPTION OF THE PREFERRED EMBODIMENTS

The present invention is made on the basis of knowledges obtained by finding the following facts through a number of experiments:

(a) Clathrate hydrates [$CO_2 \cdot (5+\frac{3}{4})H_2O$] are produced when carbon dioxide gas is made to be included in water at a predetermined temperature and at a predetermined pressure; and (b) Ice, in which a high concentration of carbon dioxide is stably included, is produced, clathrate hydrartes being included in the ice.

The clathrate hydrates are a compound in which carbon dioxide molecules are in a cage-shaped structure enclosed with a plurality of water molecules. The clathrate hydrates are of a cubical system.

Figure 2:
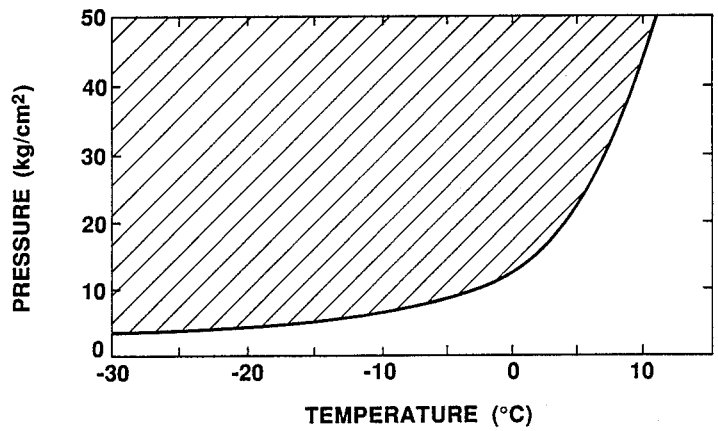
FIG. 2 is a graphical representation indicating the relation between pressures and temperatures at which clathrate hydrates of carbon dioxide are produced.

A pressure, at which the clathrate hydrates are produced, that is, a dissociation pressure is determined by a temperature. FIG. 2 is a graphical representation indicating the relation between the pressure and the temperature at which the clathrate hydrates of carbon dioxide are produced. A curve in FIG. 2 is a dissociation pressure curve. The clathrate hydrates of carbon dioxide are produced in a portion covered with oblique lines over the dissociation pressure curve in FIG. 2.

Figure 1:
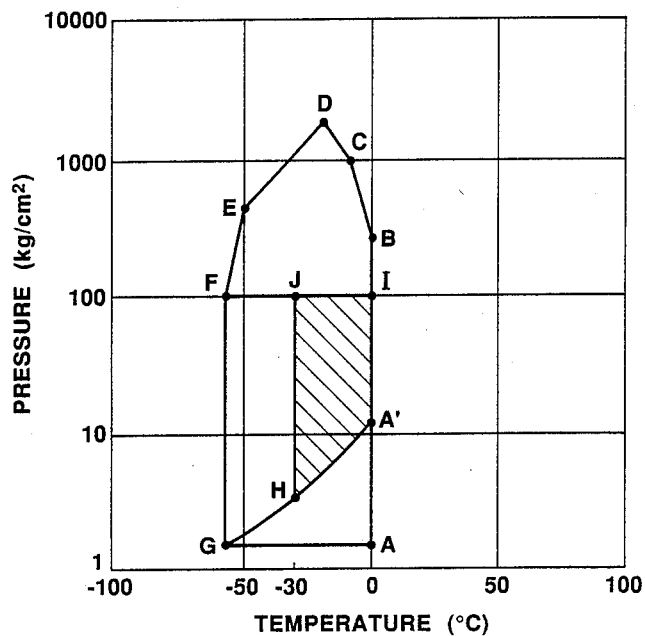
FIG. 1 is a graphical representation designating a pressure to ice and carbon dioxide gas and a temperature of ice and carbon dioxide gas when the carbondioxide gas, which, as clathrate hydrates, can be made to be included with high concentration in ice, contacts with ice.

It was understood that a concentration of carbon dioxide higher than that in prior art can be made to be included in ice when carbon dioxide not as bubbles, but as clathrate hydrates is made to be present in lattices of ice. Therefore, the present inventors have devoted themselves to the study of pressures and temperatures which are appropriate for the formation of the clathrate hydrates of carbon dioxide. As a result, the present inventors found that ice containing a high concentration of carbon dioxide could be produced owing to the formation of the clathrate hydrates of carbon dioxide when ice or water was contacted with the carbon dioxide or carbonic acid water was frozen at a temperature and at a pressure in the range enclosed with A point (0° C., 2 kg/cm$^2$), B point (0° C., 200 kg/cm$^2$), C point ($-7°$ C., 1000 kg/cm$^2$), D point ($-21°$ C., 1900 kg/cm$^2$), E point ($-50°$ C., 440 kg/cm$^2$), F point ($-57°$ C., 100 kg/cm$^2$), G point ($-57°$ C., 2 kg/cm$^2$) and A point as shown in FIG. 1. The ice thus produced contains stably the clathrate hydrates of carbon dioxide, which are dispersed homogeneously in ice of a hexagonal system, and a high concentration of carbon dioxide.

All the ice of the present invention is an ice of an ordinary hexagonal system hereinafter referred to as "I$_h$" in this text, unless otherwise specifically mentioned. This I$_h$ is when water is frozen and crystallized at the atmospheric pressure. Since carbon dioxide carbondioxide gas contained in ice at the atmospheric pressure is present in grain boundaries of ice crystals and in ice grains in the form of gas bubbles, a concentration of the carbon dioxide gas therein is low. And, the carbon dioxide gas goes easily out of grain boundaries of ice crystals at a temperature close to the melting point.

The reason why the pressure and the temperature of the mixture of carbonic acid water are limited as mentioned above in the present invention will be described below. Said mixture is the mixture of ice or water and carbon dioxide gas. In FIG. 1, the ice melts or does not freeze in the range of higher temperatures and pressures beyond the range enclosed with lines connecting A point, B point, C point and D point. The clathrate hydrates grow slowly in the range of lower temperatures and higher pressures beyond the range enclosed with lines connecting D point, E point, F point and G point. The clathrate hydrates are not produced in the range of lower pressures beyond the range enclosed with lines connecting G point and A point. A curve connecting G point ($-57°$ C., 2 kg/cm$^2$) with A' point (0° C., 12 kg/cm$^2$) is the dissociation curve shown in FIG. 2. Said clathrate hydrates are not produced in a range lower than said dissociation curve as mentioned above. Clathrate hydrates produced in a range of a temperature and a pressure, at which the clathrate hydrates can be produced, are present in the range enclosed with points A', B, C, D, E, F, G and A' as well. The clathrate hydrates are present together with carbon dioxide gas in the range enclosed with points A, A', G and A. This range is the range which can be put to practical use even though the carbon dioxide gas is present together with the clathrate hydrates in this range. The range enclosed with I point (0° C., 100 kg/cm$^2$), B point (0° C., 200 kg/cm$^2$), C point ($-7°$ C., 1000 kg/cm$^2$), D point ($-21°$ C., 1900 kg/cm$^2$), E point ($-5°$ C., 440 kg/cm$^2$), F point ($-57°$ C., 100 kg/cm$^2$) and I point is a preferable range. The range enclosed with H point ($-30°$ C., 5 kg/cm$^2$), J point ($-30°$ C., 100 kg/cm$^2$), F point ($-57°$ C., 100 kg/cm$^2$), G point ($-57°$ C., 2 kg/cm$^2$) and H point is also a preferable range.

The range enclosed with A' point (0° C., 12 kg/cm$^2$), I point (0° C., 100 kg/cm$^2$), J point ($-30°$ C., 100 kg/cm$^2$), H point ($-30°$ C., 5 kg/cm$^2$) and A' point is a range favorable for operations. That is, since a pressure is comparatively low and a temperature is comparatively high in this range, ice containing a high concentration of carbon dioxide can be economically produced by means of a simple equipment.

Even though ice containing clathrate hydrates of carbon dioxide are prepared at a pressure and at a temperature in the preferable range enclosed with points A, B, C, D, E, F, G and A or in the range enclosed with points A', I, J, H and A', the clathrate hydrates in ice obtained are liable to be unstable when they are put at atmospheric pressures. To prevent the clathrate hydrates from becoming unstable at atmospheric pressures, the clathrate hydrates are desired to be dispersed homogeneously in ice of a hexagonal system as shown in a schematical view of FIG. 3. The ice converts to a shell enveloping clathrate hydrates 1. Since the ice converts to a shell enveloping clathrate hydrates 1, the clathrate hydrates can be stably present in the ice even at atmospheric pressures because an internal stress in clathrate hydrates 1 is kept at a dissociation pressure or more.

Figure 3:
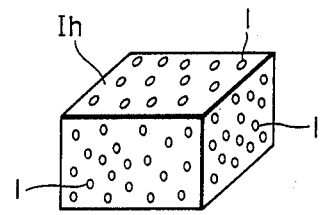
FIG. 3 is a schematic view illustrating ice produced by a method of the present invention.

Therefore, as shown in a schematic representation of FIG. 3, an internal stress of clathrate hydrates 1 is required to be kept at a dissociation pressure or more by having the clastrate hydrates dispersed homogeneously in ice I$_h$ of a hexagonal system and converting the ice I$_h$ to a shell. In this way, the clathrate hydrates of carbon dioxide can be made to be stably present in ice even at the atmospheric pressure. As mentioned above, the clathrate hydrates of carbon dioxide are dispersed in the ice having converting to a shell by controlling a concentration of the carbon dioxide in the ice. A preferable concentration of carbon dioxide is of from 2 to 50 cc for every gram of ice. When the concentration of carbon dioxide is less than 2 cc, ice containing carbon dioxide does not play its role effectively. On the other hand, when the concentration of carbon dioxide is over 50 cc, the clathrate hydrates of carbon dioxide are hard to be kept in ice having converted to a shell at the dissociation pressure or more.

Subsequently, the method for manufacturing ice containing carbon dioxide will be described with particular reference to the drawings.

Figure 4:
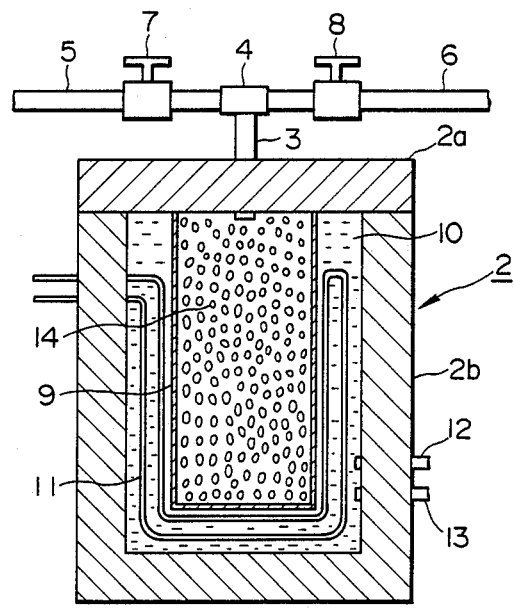
FIG. 4 is a vertical sectional view designating a pressure vessel in a first predetermined embodiment of a method of the present invention.

FIG. 4 is a vertical sectional view illustrating a pressure vessel used in a first embodiment of the present invention. As shown in FIG. 4, conduit 3, which passes through cover 2a and whose end has an opening in pressure vessel 2, is arranged approximately at the center of cover 2a of pressure vessel 2. Carbon dioxide supply pipe 5, whose end is connected to a supply source (not shown) through joint 4, and exhaust pipe 6, whose end is connected to an exhaust pump (not shown), are connected to an end of conduit 3. Valve 7 is positioned on carbon dioxide supply pipe 5 and valve 8 on exhaust pipe 6.

On the lower surface of cover 2a, there is set rubber pouch 9, whose upper end is movable, with a predetermined space from the inner surface of the pressure vessel. Cooling pipe 11, through which brine circulates, is arranged in space 10 between the inner surface of pressure vessel 2 and rubber pouch 9. In the lower portion of side wall 2b of pressure vessel 2, oil supply pipe 12 for supplying oil into space 10 from an oil supply source (not shown) and oil discharge pipe 13 for discharging oil inside the space are arranged.

Ice grains ($I_h$) 14 of a predetermined size are put into rubber pouch 9 so that rubber pouch 9 can be filled up with ice grains 14. An upper end of rubber pouch 9 is set tightly on the lower surface of cover 2a. An opening at the upper end of pressure vessel 2 is tightly closed with cover 2a. Air in rubber pouch 9 is substituted by carbon dioxide gas by exhausting the air inside rubber pouch 9 by means of exhaust pipe 6 and, subsequently, supplying the carbon dioxide into rubber pouch 9 by means of carbon dioxide supply pipe 5.

Then, oil is supplied into space 10 of pressure vessel 2 through oil supply pipe 12 to fill up space 10 with oil. Ice grains 14 inside rubber pouch 9 are pressurized by a pressing force of the oil through rubber pouch 9. A temperature of ice grains 14 under increased pressure can be optionally controlled by a temperature and an amount of brine circulating inside cooling pipe 11. A concentration of carbon dioxide gas can be optionally controlled by a pressure of the carbon dioxide gas supplied into rubber pouch 9.

As mentioned above, ice grains 14, with which rubber pouch is filled up, are contacted with the carbon dioxide under increased pressure at a pressure and at a temperature in the range enclosed with points A, B, C, D, E, F, G and A as shown in FIG. 1. As a result, contact portions among ice grains 14 inside rubber pouch 9 melt under pressure, and the carbon dioxide gas is dissolved in water made by melted ice grains. In consequence, clathrate hydrates are formed. The clathrate hydrates are frozen into ice $I_h$ by lowering a temperature of ice grains 14, and ice lumps containing carbon dioxide, in which the clathrate hydrates of carbon dioxide gas are dispersed homogeneously in ice $I_h$ as shown in FIG. 3, are produced.

Since the clathrate hydrates are formed by diffusion of carbon dioxide gas molecules in crystals of ice, a diffusion rate of the carbon dioxide gas molecules decreases and a formation rate of the clathrate hydrates decreases when a temperature of ice grains 14 is too low under increased pressure. To increase a speed of formation of the clathrate hydrates, it is desirable to make use of properties of ice that contact portions of ice grains melt when ice grains having a temperature close to their melting point are pressurized. That is, it is desirable to form clathrate hydrates by having contact portions of ice grains 14 melted under pressure and by having the carbon dioxide gas dissolved in water made by melted ice. When the ice grains are pressurized at a temperature of 0° C. or more, ice grains inside the rubber pouch converts to a kind of slurry, coexisting with water. In consequence, air in the rubber pouch is exhausted insufficiently and the carbon dioxide gas insufficiently dissolved in the ice grains. Therefore, the temperature of the ice grains is desired to be over $-5°$ and less than 0° C. when they are pressurized.

The pressure to the ice grains is desired to be in the range of a dissociation pressure or more and in the range in which the contact portions of the ice grains melt under pressure. Accordingly, the most suitable pressure to the ice grains of a temperature of over $-5°$ and less than 0° C. is desired to range 15 to 750 kg/cm$^2$.

The clathrate hydrates produced in such a manner as mentioned above releases carbon dioxide gas at the atmospheric pressure and become unstable. Dissociation of the clathrate hydrates from the ice grains is accompanied with diffusion of the carbon dioxide gas molecules in ice lumps and a plastic deformation of the ice lumps. Accordingly, the lower the temperature of the ice lumps is, the lower the dissociation rate is. In view of the above-mentioned, it is desirable to take the ice lumps out of pressure vessel 2 after having cooled the ice lumps to $-5°$ C. or less after the formation of the clathrate hydrates in the ice $I_h$.

A particle size of the ice grains which fill the inside of rubber pouch 9 of pressure vessel 2 is desired to be 10 mm or less, preferably 1 mm or less. The use of ice grains of a small size as mentioned above enables the void ratio of the ice grains which fill the inside of rubber pouch 9 to become large and the contact of the ice grains with carbon dioxide gas to be good.

Ice containing carbon dioxide can also be prepared by filling the inside of rubber pouch 9 with water instead of the ice grains. That is, the inside of rubber pouch 9 is filled up with water of a temperature of more than 0° C. The water is frozen by adding a pressure to the water at a pressure and at a temperature in the range enclosed with points of A, B, C, D, E, F, G and A as shown in FIG. 1 and by blowing carbon dioxide gas into rubber pouch 9. In this way, there are produced ice lumps containing carbon dioxide gas, in which the clathrate hydrates are dispersed homogeneously in ice.

Figure 5:
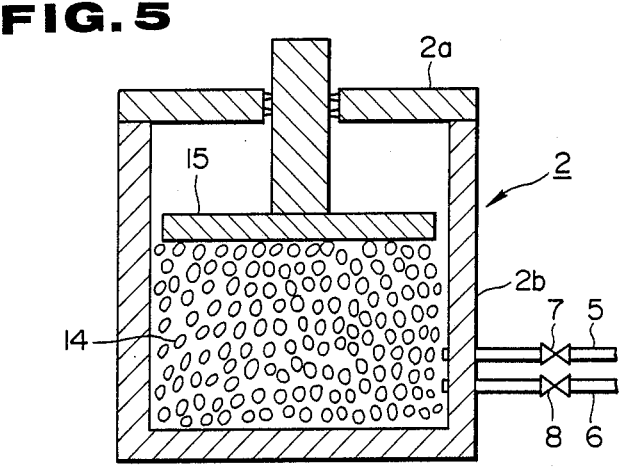
FIG. 5 is a vertical sectional view designating a pressure vessel used in a second preferred embodiment of a method of the present invention.

FIG. 5 is a vertical sectional view illustrating a pressure vessel used in a second embodiment of a method of the present invention. As shown in FIG. 5, in pressure vessel 2, piston 15 for pressing from the upper side ice grains 14 put in pressure vessel 2 is set so that piston 15 can move up-and-down, passing through cover 2a. On the upper portion of side wall 2b of pressure vessel 2, there are arranged carbon dioxide gas supply pipe 5 whose end is connected to a carbon dioxide supply source (not shown) and exhaust pipe 6 whose end is connected to an exhaust pump (not shown).

Ice grains ($I_h$) 14 of a predetermined size is put in pressure vessel 2 and pressure vessel 2 is tightly closed with cover 2a. Air inside pressure vessel 2 is substituted for carbon dioxide gas by exhausting the air outwardly by means of exhaust pipe 6 and, subsequently, by supplying carbon dioxide gas into pressure vessel 2 by means of carbon dioxide gas supply pipe 5.

Ice grains 14 are made to contact with carbon dioxide gas by applying a pressure to a number of ice grains 14 by means of piston 15, which is made to go down by use of an up-and-down movement mechanism (not shown), at a pressure and at a temperature in the range enclosed with points of A, B, C, D, E, F, G and A as shown in FIG. 1. As a result, contact portions of ice grains 14 inside pressure vessel 2 melt under pressure. Carbon dioxide gas dissolves in water produced by melting of ice grains 14 and clathrate hydrates are formed. Subsequently, the clathrate hydrates are frozen in ice $I_h$ by lowering the temperature of ice grains 14 by means of a cooling unit (not shown), and ice lumps containing carbon dioxide gas, in which clathrate hydrates 1 of carbondioxide gas are dispersed in ice $I_h$ homogeneously, are produced. The temperature of the ice grains, the pressure to the ice grains and other conditions which are favorable during the application of the pressure to the ice grains are as described above.

Figure 6:
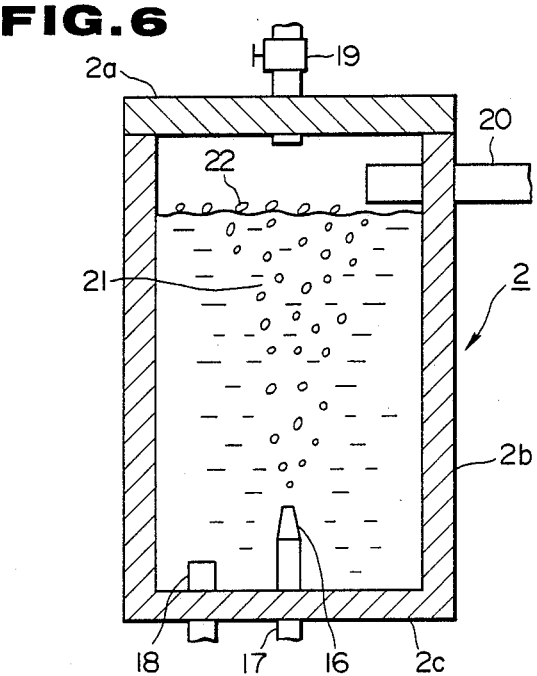
FIG. 6 is a vertical sectional view designating a pressure vessel in a third preferred embodiment of a method of the present invention.

FIG. 6 is a vertical sectional view illustrating a pressure vessel used in a third embodiment of a method of the present invention. As shown in FIG. 6, vertical nozzle 16 for injected carbon dioxide water into pressure vessel 2 is arranged in bottom wall 2c of pressure vessel 2. Conduit 17 whose end is connected to a unit for manufacturing carbonic acid water (not shown) is connected to nozzle 16. Antifreeze liquid supply pipe 18, whose end is connected to an antifreeze storage tank (not shown), is arranged on bottom wall 2c. Pressure control valve 19 for controlling a pressure inside pressure vessel 2 is positioned on cover 2a of pressure vessel 2. Referential numeral 20 denotes ice collecting mechanism (not shown) having therein a screw conveyor which is arranged on the upper portion of side wall 2b of pressure vessel 2. Pressure vessel 2 can be cooled by a cooling unit (not shown).

The inside of pressure vessel 2 is filled up with antifreeze liquid 21 such as liquefied carbonic acid, liquefied nitrogen and the like, which is a liquid at a temperature of 0° C. or less and in which water does not dissolve. A pressure to antifreeze liquid 21 and a temperature thereof inside pressure vessel 2 are controlled with the use of pressure control valve 19 and a cooling unit (not shown).

Subsequently, carbonic acid water containing a predetermined concentration of carbon dioxide gas is poured into antifreeze liquid 21 inside pressure vessel 2 through nozzle 16. The carbonic acid water injected into antifreeze liquid 21 is cooled and frozen into small balls when it rises in antifreeze liquid 21 and turns into ice grains containing clathrate hydrates of carbon dioxide gas which rise to the surface of antifreeze liquid 21. Ice grains 22 having risen in this way to the surface of antifreeze liquid are taken out of pressure vessel 2 by means of ice collecting mechanism 20. When the antifreeze liquid inside pressure vessel 2 is decreased to a predetermined amount of less, being vaporized by heat exchange with carbonic acid water, the antifreeze liquid is supplied through antifreeze supply pipe 18.

The temperature of antifreeze liquid 21 inside pressure vessel 2 is preferred to be $-30°$ C. or more to prevent nozzles 16 from being frozen. On the other hand, when the temperature of antifreeze liquid 21 is high, carbonic acid water, which is injected from the bottom of pressure vessel 2 and rises to the surface of antifreeze liquid 21, remains not frozen and liquid, and, when antifreeze liquid 21 is cooled by taking much time, said carbonic acid water has a possibility of being frozen into a large lump of ice. To avoid this, the temperature of antifreeze liquid 21 is preferred to be $-10°$ C. or less. The pressure of antifreeze liquid 21 is desired to be from 10 to 100 kg/cm² so that clathrate hydrates of carbon dioxide can be surely included in ice grains 22 by the antifreeze liquid of from $-30°$ to $-10°$ C. in this way.

Ice grains 22, in which the clathrate hydrates of carbon dioxide gas are dispersed homogeneously in ice, are obtained by making the carbonic acid water poured into antifreeze liquid 21 through nozzle 16 homogeneous. A concentration of carbon dioxide gas in ice grains 22 can be controlled by a concentration of carbon dioxide gas in carbonic acid water. The ice grains can be continuously taken out by continuously pouring carbonic acid water according to the third Embodiment.

EXAMPLE 1

The inside of rubber pouch 9 of pressure vessel 2 as shown in FIG. 4 was filled up with 700 g of transparent ice grains ($I_h$) 14 of 1 mm or less in particle size not containing air. The air inside rubber pouch 9 was exhausted outwardly through exhaust pipe 6, and carbon dioxide gas was supplied into rubber pouch 9 through gas supply pipe 5. A pressure of the carbon dioxide gas in rubber pouch 9 was of 9.5 atm.

Oil was supplied into space 10 between the inner surface of pressure vessel 2 and rubber pouch 9 through oil supply pipe 12. Ice grains 14 inside rubber pouch 9 was pressurized at a pressure of 40 kg/cm² by controlling a flow of brine circulating inside cooling pipe 11. A temperature of ice grains 14 was kept at 0° C.

After the ice grains had been kept in such a state for an hour, the ice grains inside rubber pouch 9 were cooled to $-10°$ C. and frozen by controlling the flow of the brine circulating inside cooling pipe 11. In this way, ice lumps containing carbon dioxide gas in which clathrate hydrates 1 of carbon dioxide gas were diffused homogeneously in ice $I_h$ as shown in FIG. 3 were obtained. The ice lumps were taken out of rubber pouch 9 and pressure vessel 2 and put under the atmospheric pressure. The ice lumps contained 10.8 cc/g of carbon dioxide gas and were transparent without having bubbles at the atmospheric pressure and at 0° C.

The ice lumps prepared in such a manner as described above were crushed, and ice pieces of an appropriate size were made. These ice pieces were tried for drinks. As a result, a strong palate and stimulus were felt. When said ice pieces were added to drinks such as water, juice, alcohol and the like, said drinks were converted to carbonic acid drinks which discharged a high concentration of carbon dioxide gas.

EXAMPLE 2

8000 cc of liquefied carbon dioxide as antifreeze liquid 21 was supplied into pressure vessel 2 as shown in FIG. 6. A pressure to said liquefied carbon dioxide in pressure vesel 2 was kept at 22 kg/cm². A temperature of said liquefied carbon dioxide was kept at $-18.5°$ C. Subsequently, carbonic acid water containing 10 cc/cc of carbonic acid gas [a volume of carbon dioxide melted in 1 cc of water (0° C., 1 atm)] was injected into liquefied carbon dioxide inside pressure vessel 2 through nozzle 16 at a rate of 75 cc/min.

In consequence, ice grains of from 2 to 3 mm in particle size containing 6.7 cc/g of carbon dioxide were obtained. Forms, properties, etc. of the ice grains were the same as those in example 1.

As described above, the present invention is effective in the industrial use of a method for manufacturing ice containing a high concentration of carbon dioxide gas stably for a long period of time and, moreover, transparent ice providing its users with refreshment without carbon dioxide gas bubbles.

What is claimed is:

1. A method for manufacturing ice containing carbon dioxide comprising the steps of:
    charging material comprising ice grains or water for forming the ice, into a pressure vessel;

enveloping said material in an atmosphere of carbon dioxide;

converting the material into clathrate hydrate by adjusting temperature and pressure of said material to be within an area enclosed with a line connecting points A, B, C, D, E, F, G and A in this order on a plot indicating temperature and pressure as illustrated in FIG. 1, and where each of said seven alphabet letters represents as follows:

| A: | 0° C., | 2 kg/cm$^2$; | B: | 0° C., | 200 kg/cm$^2$; |
|---|---|---|---|---|---|
| C: | −7° C., | 1000 kg/cm$^2$; | D: | −21° C., | 1900 kg/cm$^2$; |
| E: | −50° C., | 440 kg/cm$^2$; | F: | −57° C., | 100 kg/cm$^2$; and |
| G: | −57° C., | 2 kg/cm$^2$ | | | |

2. The method of claim 1, wherein said area is enclosed by points of A', I, J, H and A' on the plot with a curved line between A' and H representing a clathrate hydrate dissociation curve, as illustrated in FIG. 1 and where each of said four alphabet letters represent as follows:

| A': | 0° C., | 12 kg/cm$^2$; | I: | 0° C., | 100 kg/cm$^2$; |
|---|---|---|---|---|---|
| J: | −30° C., | 100 kg/cm$^2$; and | H: | −30° C., | 5 kg/cm$^2$. |

3. The method of claim 1, wherein said temperature and pressure is adjusted to a temperature between −5° and 0° C. and a pressure of 15 and 750 kg/cm$^2$ inclusive and after the ice is formed, reducing the temperature to less than −5° C. for storage.

4. The method of claim 1, wherein said material is ice grains having a particle size of 10 mm or less.

5. The method of claim 1, wherein the ice grains put into the pressure vessel are pressurized by a piston.

6. A method for manufacturing ice containing carbon dioxide comprising the steps of:

charging material comprising ice grains or water for the ice containing carbon dioxide into a flexible material pouch and putting said flexible material pouch into a pressure vessel;

filling up said flexible material pouch with carbon dioxide gas;

introducing anti-freeze liquid into the space between said flexible material pouch and an inner wall of said pressure vessel;

adjusting temperature and pressure of said material to be within an area enclosed with a line connecting points of A, B, C, D, E, F, G and A in this order on a plot of temperature and pressure, as illustrated in FIG. 1, where each of said nine alphabet letters represents as follows:

| A: | 0° C., | 2 kg/cm$^2$; | B: | 0° C., | 200 kg/cm$^2$; |
|---|---|---|---|---|---|
| C: | −7° C., | 1000 kg/cm$^2$; | D: | −21° C., | 1900 kg/cm$^2$; |
| E: | −50° C., | 440 kg/cm$^2$; | F: | −57° C., | 100 kg/cm$^2$; and |
| G: | −57° C., | 2 kg/cm$^2$. | | | |

7. The method of claim 6, wherein said area is enclosed by points of A', I, J, H and A' on the plot with a curve line between A' and H representing a clathrate hydrate dissociation curve, where each of said four alphabet letters represents as follows:

| A': | 0° C., | 12 kg/cm$^2$; | I: | 0° C., | 100 kg/cm$^2$; |
|---|---|---|---|---|---|
| J: | −30° C., | 100 kg/cm$^2$; and | H: | −30° C., | 5 kg/cm$^2$. |

8. The method of claim 6, wherein said material is ice grains having a particle size of 10 mm or less.

9. The method of claim 6, wherein said temperature and pressure is adjusted to a temperature between −5° and 0° C. and a pressure of 15 and 750 kg/cm$^2$ inclusive and after the ice is formed, reducing the temperature to less than −5° C. for storage.

10. A method for manufacturing ice containing carbon dioxide comprising the steps of:

charging material comprising carbonic acid water for forming the ice containing carbon dioxide into a pressure vessel;

converting the material into clathrate hydrate by adjusting temperature and pressure of said material to be within an area enclosed with a line connecting points of A, B, C, D, E, F, G and A in this order on a plot indicating temperature and pressure as illustrated in FIG. 1, and where each of said nine alphabet letters represents as follows:

| A: | 0° C., | 2 kg/cm$^2$; | B: | 0° C., | 200 kg/cm$^2$; |
|---|---|---|---|---|---|
| C: | −7° C., | 1000 kg/cm$^2$; | D: | −21° C., | 1900 kg/cm$^2$; |
| E: | −50° C., | 440 kg/cm$^2$; | F: | −57° C., | 100 kg/cm$^2$; and |
| G: | −57° C., | 2 kg/cm$^2$. | | | |

11. The method of claim 10, wherein said area is enclosed by points of A', I, J, H and A' on the plot with a curved line between A' and H representing clathrate hydrate dissociation curve, as illustrated in FIG. 1 and where each of said four alphabet letters represent as follows:

| A': | 0° C., | 12 kg/cm$^2$; | I: | 0° C., | 100 kg/cm$^2$; |
|---|---|---|---|---|---|
| J: | −30° C., | 100 kg/cm$^2$; and | H: | −30° C., | 5 kg/cm$^2$. |

12. The method of claim 10, wherein said temperature and pressure is adjusted to a temperature between −30° and −10° C. and a pressure of 10 and 100 kg/cm$^2$.

13. A method for manufacturing ice containing carbon dioxide comprising the steps of:

charging material comprising carbonated water used for ice containing carbon dioxide into a flexible material pouch and putting said flexible material pouch into a pressure vessel;

filling up said flexible material pouch with carbon dioxide gas;

introducing anti-freeze liquid into the space between said flexible material pouch and an inner wall of said pressure vessel;

adjusting temperature and pressure of said material to be within an area enclosed with a line connecting points of A, B, C, D, E, F, G and A in this order on a plot of temperature and pressure, as illustrated in FIG. 1, where each of said seven alphabet letters represents as follows:

| A: | 0° C., | 2 kg/cm$^2$; | B: | 0° C., | 200 kg/cm$^2$; |
|---|---|---|---|---|---|
| C: | −7° C., | 1000 kg/cm$^2$; | D: | −21° C., | 1900 kg/cm$^2$; |
| E: | −50° C., | 440 kg/cm$^2$; | F: | −57° C., | 100 kg/cm$^2$; and |
| G: | −57° C., | 2 kg/cm$^2$. | | | |

14. The method of claim 6, wherein said area is enclosed by points of A', I, J, H and A' on the plot with a curved line between A' and H representing clathrate hydrate dissociation curve, as illustrated in FIG. 1 and where each of said four alphabet letters represent as follows:

| | | | | |
|---|---|---|---|---|
| A': | 0° C., 12 kg/cm$^2$; | I: | 0° C., 100 kg/cm$^2$; |
| J: | −30° C., 100 kg/cm$^2$; and | H: | −30° C., 5 kg/cm$^2$. |

15. A method for manufacturing ice containing carbon dioxide comprising the steps of:
   introducing anti-freeze liquid into a pressure vessel;
   adjusting temperature and pressure of the inside of said pressure vessel to be within an area enclosed with a line connecting points of A, B, C, D, F, G and A in this order on a plot indicating temperature and pressure, as illustrated in FIG. 1 and where each of said nine alphabet letters represents as follows:

| | | | | |
|---|---|---|---|---|
| A: | 0° C., 2 kg/cm$^2$; | B: | 0° C., 200 kg/cm$^2$; |
| C: | −7° C., 1000 kg/cm$^2$; | D: | −21° C., 1900 kg/cm$^2$; |
| E: | −50° C., 440 kg/cm$^2$; | F: | −57° C., 100 kg/cm$^2$; and |
| G: | −57° C., 2 kg/cm$^2$; | | | producing clathrate hydrate by injecting carbonic acid water containing a predetermined concentration of carbon dioxide into said anti-freeze liquid, and maintaining said temperature and said pressure until the ice is formed.

16. The method of claim 15, wherein said area is enclosed by points of A', I, J, H and A' on the plot with a curved line between A' and H representing clathrate hydrate dissociation curve, as illustrated in FIG. 1 and where each of said four alphabet letters represent as follows:

| | | | | |
|---|---|---|---|---|
| A': | 0° C., 12 kg/cm$^2$; | I: | 0° C., 100 kg/cm$^2$; |
| J: | −30° C., 100 kg/cm$^2$; and | H: | −30° C., 5 kg/cm$^2$. |

17. The method of claim 15, which further comprises the additional steps of:
   continuously taking out ice containing carbon dioxide;
   further continuously supplying said anti-freeze liquid into the pressure vessel for supplementation for consumption of the anti-freeze already charged; and
   continuously supplying said carbonic acid water for supplementation for consumption of said carbonic acid water already injected.

18. The method of claim 17, wherein said temperature and pressure is adjusted to a temperature between −30° and −10° C. and a pressure of 10 and 100 kg/cm$^2$.

19. The method of claim 17, wherein said area is enclosed by points of A', I, J, H and A' on the plot with a curved line between A' and H representing clathrate hydrate dissociation curve, as illustrated in FIG. 1 and where each of said four alphabet letters represent as follows:

| | | | | |
|---|---|---|---|---|
| A': | 0° C., 12 kg/cm$^2$; | I: | 0° C., 100 kg/cm$^2$; |
| J: | −30° C., 100 kg/cm$^2$; and | H: | −30° C., 5 kg/cm$^2$. |

* * * * *